US007450803B2

(12) United States Patent
Miyadera et al.

(10) Patent No.: US 7,450,803 B2
(45) Date of Patent: Nov. 11, 2008

(54) OPTICAL WAVEGUIDE

(75) Inventors: Nobuo Miyadera, Tsukuba (JP); Rei Yamamoto, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/580,916

(22) Filed: Oct. 16, 2006

(65) Prior Publication Data

US 2007/0086705 A1 Apr. 19, 2007

Related U.S. Application Data

(63) Continuation of application No. PCT/JP2004/005328, filed on Apr. 14, 2004.

(51) Int. Cl.
G02B 6/26 (2006.01)
(52) U.S. Cl. .............. 385/43; 385/45; 385/129; 385/132
(58) Field of Classification Search ............. 385/14, 385/43, 45, 129, 130, 132
See application file for complete search history.

(56) References Cited

U.S. PATENT DOCUMENTS

2002/0154879 A1* 10/2002 Yasuda et al. ............... 385/132

FOREIGN PATENT DOCUMENTS

| JP | 02-234108 | 9/1990 |
| JP | 04-213407 | 8/1992 |
| JP | 07-102088 | 4/1995 |
| JP | 08-036114 | 2/1996 |
| JP | 09-061648 | 3/1997 |
| JP | 2000-121857 | 4/2000 |

OTHER PUBLICATIONS

Japanese Official Action for Application No. 2003-092539, issued Jul. 23, 2007.
Francois Ladouceur and Pierre Labeye, "A New General Approach to Optical Waveguide Path Design," Journal of Lightwave Technology, vol. 13, No. 3, Mar. 1995, p. 481-492.

* cited by examiner

*Primary Examiner*—Frank G Font
*Assistant Examiner*—Michael P Mooney
(74) *Attorney, Agent, or Firm*—Antonelli, Terry, Stout & Kraus, LLP.

(57) ABSTRACT

The invention is directed to an optical waveguide that reduces an excess loss caused in a curved waveguide region by a deviation of the center axis of a beam propagating mode from the center axis of the optical waveguide. The optical waveguide has its part curved, and assuming that the shortest distance from a certain point of a convex edge of the curved portion to a concave edge is a waveguide width at that point, the optical waveguide has its width progressively reduced from the maximum waveguide width in the midst of the curved portion toward the opposite ends of the curved portion.

19 Claims, 3 Drawing Sheets

OPTICAL WAVEGUIDE

This application is a Continuation application under 35 USC 363 and 35 USC 120 of International (PCT) Application No. PCT/JP2004/005328, filed Apr. 14, 2004.

FIELD OF THE INVENTION

The present invention relates to an optical waveguide, a Y-shaped optical waveguide, and an optical apparatus having the same, and a method of manufacturing them.

BACKGROUND ART

Recently, as PC and Internet related industries grow more, a demand for larger scale data transfer has been rapidly increasing, and an accelerated optical data transfer is now prevailing. An optical waveguide serves as an optical Internet connection for optical data transfer. For instance, an optical apparatus such as an optical splitter (optical branching/coupling unit) has a tapered waveguide and a plurality of curved waveguides optically combined with each other in practical use. Such curved waveguides are typically constant in their respective core widths.

Some curved waveguide has its core width varied throughout the entire length, and one typical example is known as a curved waveguide that has its core width progressively enlarged and has both an outer and inner contours of its Y-branch portion shaped on the basis of a certain function in order to reduce an excess loss in the branching portion. See Japanese Patent No. 2589367.

In the case of an optical splitter made up of optical waveguides, especially in a part where two of curved waveguides are connected to a tapered waveguide, it is advantageous spacing those curved waveguides gradually farther away from each other from infinitely small interval in order to reduce an excess loss, but it is an unattainable job to locate the waveguides at such an infinitely small interval with a satisfactory yield because of a restraint of the manufacturing. Instead, disposing both the curved waveguides at a certain finitely small interval permits a reduction in adverse effects of an uneven configuration of the fabricated branching portion, and also permits a reduction in incomplete filling of a narrowed portion with cladding substance. The interval thus widened between the two waveguides unavoidably causes leak of light more into the cladding, and resultantly, causes an excess loss due to an excessive branching width.

The inventors of the present invention found a solution to the aforementioned prior art disadvantages by altering a curved shape of the optical waveguides and completed the invention. More preferably, the present invention overcomes the aforementioned disadvantages by altering a curved shape of an inner circumference of the optical waveguides.

SUMMARY OF THE INVENTION

In a first aspect of the present invention, a curved optical waveguide includes a core region having opposite ends, and inner and outer edge portions, and there is one or more sections in the middle of the core region that is greater in core width than the wider one of the opposite ends.

In a second aspect of the present invention, an optical waveguide having its part curved is provided. The curved portion of the waveguide, having a physical width of the shortest extension from a certain point of an outer edge portion to an inner edge portion, has its physical width progressively reduced from the greatest physical width in the midst of the curved portion toward the opposite ends of the same. Assuming that a straight line L in the outer edge portion between the opposite ends of the curved portion is designated by l in length, a length from the straight line L to the apex point of the outer edge portion is designated by h as a maximum height, a straight line L' in the inner edge portion between the opposite ends of the curved portion is designated by l' in length, and a length from the straight line L' to the deepest point of the inner edge portion is designated by h' as a maximum height, the lengths and the heights exhibit a relation as follows:

$$h/l > h'/l'$$

In a third aspect of the present invention, an optical waveguide having its part curved is provided. The curved portion of the waveguide has its inner edge portion smaller in curvature than its outer edge portion.

In any of the first to third aspects of the present invention, the optical waveguide may be exemplified with any of the following features:

(i) The inner edge portion is straight,
(ii) The opposite ends of the curved portion are approximately identical in physical width,
(iii) The an outer and inner edge portions are arcuate, and normal lines to the an outer and inner arcs overlap the same straight line at the opposite ends of the maximum physical width,
(iv) At least part of the optical waveguide is made of polymer, and
(v) The polymer is polyimide resin containing fluorine.

In a fourth aspect of the present invention, provided is an optical apparatus having an optical waveguide as defined in any of the first to third aspects of the present invention.

In a fifth aspect of the present invention, provided is a branching optical waveguide structure having a primary waveguide segment and two or more branching optical waveguide segments split out of the primary segment in a substrate. At least one of the branching optical waveguide segments is a curved segment and includes a core region having opposite ends, and inner and outer edge portions, and there is one or more sections in the middle of the core region that is greater in core width than the wider one of the opposite ends.

In a sixth aspect of the present invention, a branching optical waveguide structure having a primary waveguide segment and two or more branching optical waveguide segments split out of the primary segment in a substrate is provided. At least one of the branching optical waveguide segments includes an outer edge portion successively arcuately varied in a closer position to the other of the branching optical waveguide segments and an inner edge portion opposite to it. The branching optical waveguide segment, having a physical width of the shortest extension from a certain point of the outer edge portion to the inner edge portion, has its physical width progressively reduced from the greatest physical width in the midst of the arcuated portion toward the opposite ends of the same. Assuming that a straight line L in the outer edge portion between the opposite ends of the arcuated portion is designated by l in length, a length from the straight line L to the apex point of the outer edge portion is designated by h as a maximum height, a straight line L' in the inner edge portion between the opposite ends of the arcuated portion is designated by l' in length, and a length from the straight line L' to the deepest point of the inner edge portion is designated by h' as a maximum height, the lengths and the heights exhibit a relation as follows:

$h/1 > h'/l'$

Such a Y-shaped waveguide can be configured by means of the tapering, an MMI structure, a directional coupler, and the like. Two of the branching optical waveguide segments may be optically coupled to a split point either in parallel with each other or at a certain angle between them. The angle at which the two branching optical waveguide segments meet is preferably not so large. Preferably, the angle is 10 degrees or less. More preferably, the angle is 5 degrees or less. Further more preferably, the angle is 1 degree or less.

In a seventh aspect of the present invention, provided is a branching optical waveguide structure having a primary waveguide segment and two or more branching optical waveguide segments split out of the primary segment in a substrate. At least one of the branching optical waveguide segments has its part curved, and the curved portion of the waveguide has its outer edge portion smaller in curvature than its inner edge portion.

In any of the fifth to seventh aspects of the present invention, the optical waveguide may be exemplified with any of the following features:

(vi) The branching optical waveguide structure, having a primary waveguide segment and two or more branching optical waveguide segments split out of the primary segment, is Y-shaped, (vii) The curved portion has its one end closer to the primary waveguide segment located 100 to 1000 micrometers away from a split point of the branching optical waveguide segments, and (viii) The curved portion is 100 to 400 micrometers in length.

In an eighth aspect of the present invention, an optical apparatus having a branching optical waveguide structure as defined in any of the fifth to seventh aspects of the present invention is provided.

In a ninth aspect of the present invention, provided is a mask used in manufacturing a curved optical waveguide that includes a core region having opposite ends, and inner and outer edge portions where there is one or more sections in the middle of the core region that is greater in core width than the wider one of the opposite ends.

In a tenth aspect of the present invention, provided is a mask used in manufacturing an optical waveguide that has its part curved where the curved portion, having an physical width of the shortest extension from a certain point of an outer edge portion to an inner edge portion, has its physical width progressively reduced from the greatest physical width in the midst of the curved portion toward the opposite ends of the same. Assuming that a straight line L in the outer edge portion between the opposite ends of the curved portion is designated by l in length, a length from the straight line L to the apex point of the outer edge portion is designated by h as a maximum height, a straight line L' in the inner edge portion between the opposite ends of the curved portion is designated by l' in length, and a length from the straight line L' to the deepest point of the inner edge portion is designated by h' as a maximum height, the lengths and the heights exhibit a relation as follows:

$h/1 > h'/l'$

In an eleventh aspect of the present invention, provided is a mask used in manufacturing an optical waveguide that has its part curved where the curved portion has its inner edge portion smaller in curvature than its outer edge portion.

In any of the ninth to eleventh aspects of the present invention, the mask used in manufacturing an optical waveguide may be exemplified with any of the following features:

(ix) The inner edge portion is straight, (x) The opposite ends of the curved portion are approximately identical in physical width, (xi) The outer and inner edge portions are arcuate, and normal lines to the outer and inner arcs overlap the same straight line at the opposite ends of the maximum physical width.

In a twelfth aspect of the present invention, provided is a method of manufacturing a curved optical waveguide where a mask is used during the manufacturing process.

BRIEF DESCRIPTION OF THE DRAWINGS

The invention may best be understood by referring to the following description and accompanying drawings that are used to illustrate embodiments of the invention.

DETAILED DESCRIPTION OF THE INVENTION

The term "curved optical waveguide" used herein means an optical waveguide that has at least an outer edge portion or its outer circumferential part curved in top plan contours of the waveguide as seen from the above.

The term "outer circumference of the curved optical waveguide" used herein means circumferential contours on the convex side of a curved core of the waveguide. Thus, the term "inner circumference" used herein means circumferential contours on the concave side of the curved core. The inner circumference, however, may be of straight line (i.e., curvature=0) as mentioned later.

Figure 1:
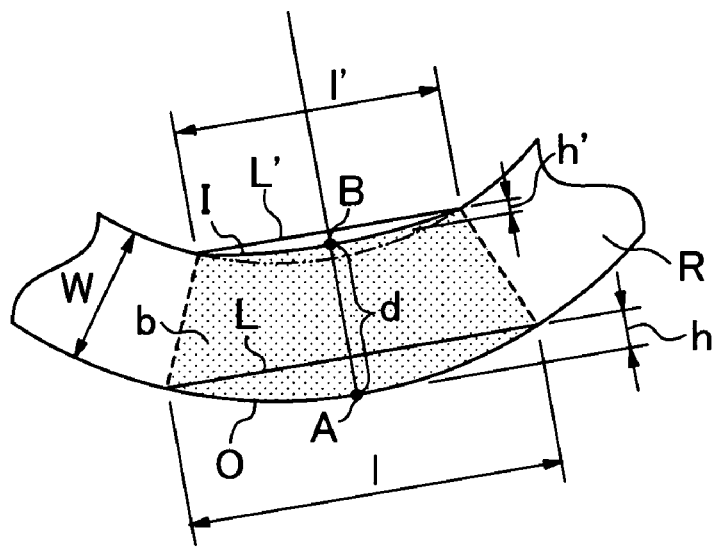
FIG. 1 is a diagram illustrating a first preferred embodiment of an optical waveguide according to the present invention.

The optical waveguide of the present invention is, as can be seen in FIG. 1, characterized in that a curvature at an arbitrary point A in an outer circumference is greater than that at an intersection B between an inner circumference and an extension of a normal line at the point A. Configured in this manner, the curved optical waveguide can minimize a deviation of the center axis of a beam propagating path from the center axis of the waveguide. A curvature of the inner circumference is preferably naught, namely, the inner circumference is of straight line. This facilitates a simplification of the manufacturing process, and it is also effective to reduce the deviation of the center axis of the beam propagating mode from the center axis of the optical waveguide.

Preferably, the optical waveguide has opposite optical junction ends that are identical in physical width (denoted by d in FIG. 1). Specifically, one exemplified curved optical waveguide according to the present invention is incorporated as segmented parts of an optical waveguide having a constant core width throughout the entire extension, and in coupling any of such segments to the primary optical waveguide segment, both the segments should be identical in core width at their respective junction ends. The "core width" is herein defined as a minimized length from the inner circumference to the outer circumference.

In a modified embodiment of the present invention, the inner and outer circumferences of the optical waveguide may have the common center of radius of curvature at the junction ends of both the primary and inserted waveguide segments.

The curved optical waveguide of the present invention can be incorporated as part in an optical apparatus. The optical apparatus may be something like an optical splitter, an optical coupler, an optical diverging/converging unit, a wavelength multiplexer/demultiplexer, an optical signal transmitting module, an optical signal receiving module, an optical signal bi-directional transmission module, an optical modulator, a beam filter, an optical polarizer, a beam dispersion compensator, an optical add/drop module, an optical cross-connect, or the like.

Now discussed will be a case where the optical apparatus is a optical splitter. The optical splitter is a device serving to split a light beam, and specifically, as will be recognized in FIG. 2, a tapered waveguide C optically-mechanically joins at least two of the optical waveguide segments, D and D', for example.

Incorporating the curved optical waveguide according to the present invention as segmented parts of the optical splitter permits a reduction of a excess loss that is caused by an optical junction of the tapered waveguide with more than one curved waveguide segments. At he junction of the tapered waveguide C with the branching optical waveguide segments D and D', the waveguide segments D and D' have their respective optical centers deviated inward, and this brings about an optical coupling of the reduced excess loss. For either of the branching optical waveguide segments D and D', a widened portion in the vicinity of the mid zone of the curved optical waveguide of the present invention compensates for the deviation from the optical center by enabling the optical center to shift toward the physical center of the optical waveguide.

Figure 4:
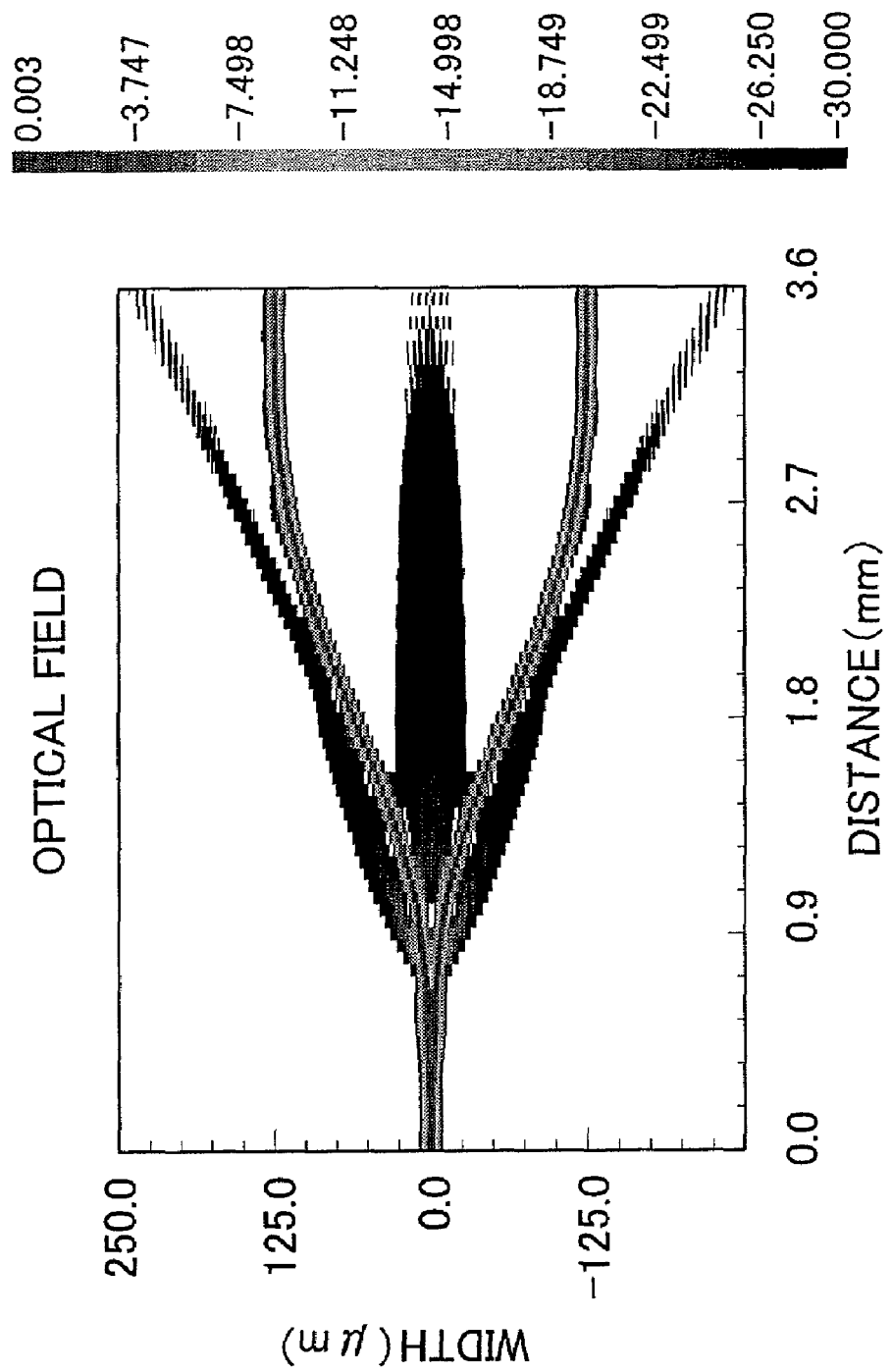
FIG. 4 depicts an excess loss in an optical splitter using a prior art curved optical waveguide.

In the prior art embodiment of the similar case, the junction of two of such curved optical waveguide segments to the tapered waveguide is restricted in the manufacturing process to juxtapose the curved waveguide segments at a wider interval therebetween, which can effectively avoid non-uniformity in a configuration of the branching portion of the products. In addition to that, this also reduces an incomplete filling of a narrow area with a clad substance. However, there still occurs a leak of light through the widened interval into the cladding. At the junction of the tapered waveguide with the branching segments, the curved waveguide segments, if shaped to have a curvature in the vicinity of the junction, allow for an optical coupling at a reduced excess loss. However, two of the curved waveguide segments coupled to the tapered waveguide at the junction, as shaped respectively in convex projecting in a zone defined between those two branching optical waveguide segments, have the center of their respective beam propagating mode deviated inward in the convex zones. Additionally, since the two curved waveguide segments split farther from each other as they run distally from the junction, light leaks inward from the branching optical waveguide segments. This will be able to be recognized in FIG. 4 in which the excess loss is expressed in brightness along with the prior art curved optical waveguide coupled to the tapered waveguide at which the optical path splits into branching segments.

Figure 3:
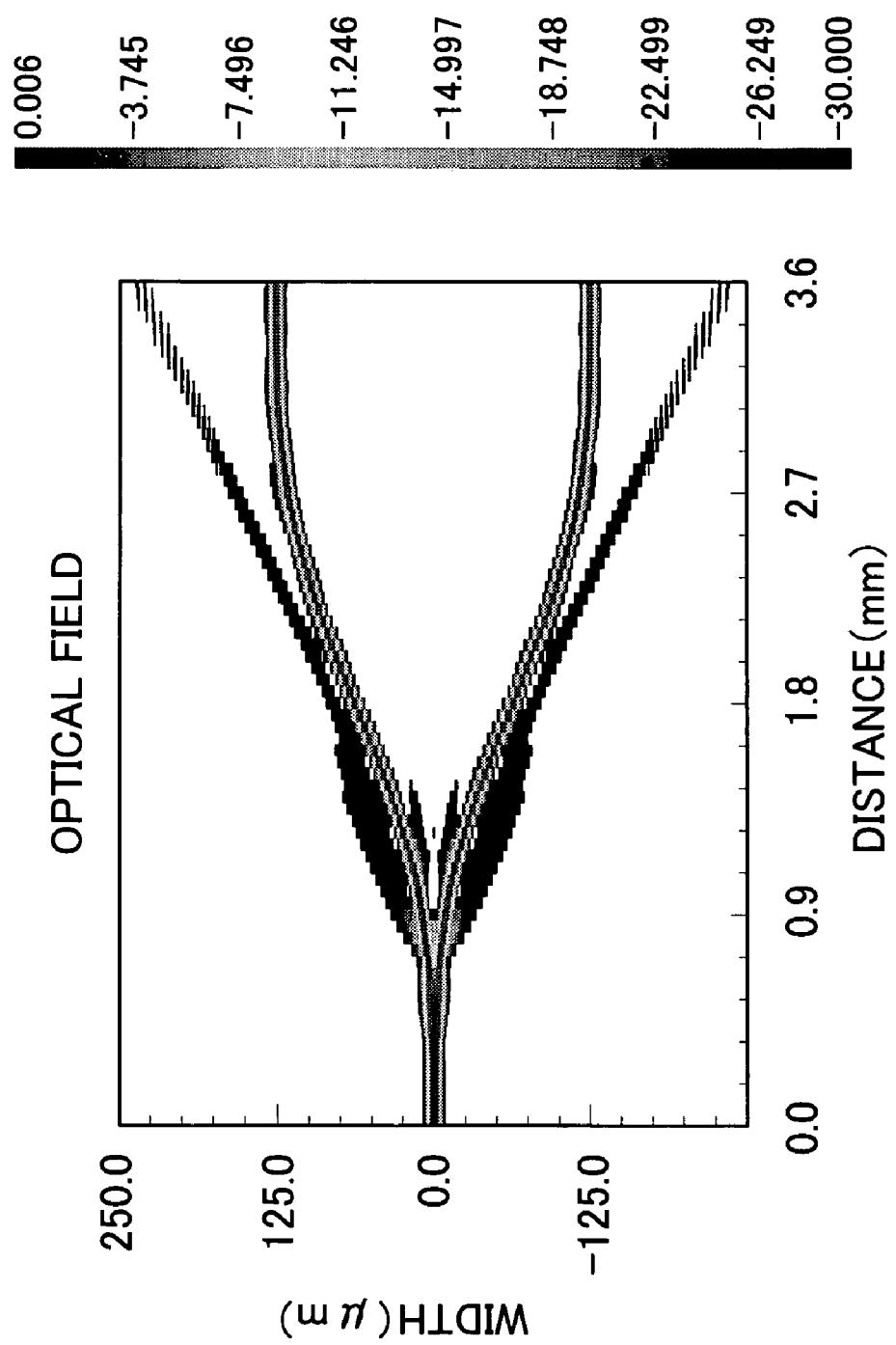
FIG. 3 depicts an excess loss in an optical splitter using a curved optical waveguide according to the present invention.

In contrast, the curved optical waveguide according to the present invention, when disposed as segmented part of the prior art curved optical waveguide, permits a reduction of the deviation of the center axis of the light beam propagating mode from the center axis of the optical waveguide, and as a consequence, the excess loss can be reduced (see FIG. 3).

A distance from branching ends of the curved optical waveguide segments E and E' to the tapered waveguide C (designated by "a" in FIG. 2) can be appropriately determined to any range as desired, depending upon a core width, a node nature of a curve, and the like. For instance, when the core width is 6.5 micrometers and a differential refractive index is 0.4%, the distance "a" preferably ranges from 100 to 1000 micrometers, more preferably 150 to 500 micrometers. Positioning within the range permits the excess loss to reduce more.

A length of the curved optical waveguide segments E, E' (designated by "b" in FIG. 2) can similarly be determined to an appropriate range, depending upon factors of the core width, the differential refractive index, and the like. When the core width is 6.5 micrometers and the differential refractive index is 0.4%, for example, the length "b" preferably ranges from 100 to 400 micrometers, and more preferably 150 to 300 micrometers. This is because the longer curved waveguide segment increases in excess loss due to an excitation of a higher-order mode, and reversely, the excessively short curved waveguide segment brings about a poor effect in reducing a deviation from the optical center.

Another embodiment of the curved optical waveguide according to the present invention will now be described. Disadvantages of the prior art curved optical waveguide as stated in the above-identified paragraph [0004] are overcome by a solution of the aforementioned optical waveguide where both the primary and inserted waveguide segments are identical in width at their optical junction ends, and the remaining portion of the optical waveguide is greater in width than the optical junction ends of both the primary and inserted waveguide segments. Definitions of the curved optical waveguide and other components are as mentioned above. With such a modification of the curved optical waveguide, the deviation of the center axis of the light propagating mode from the optical axis of the optical waveguide in the curved portion can be reduced, and the resultant excess loss can further be reduced. An inner circumference of the curved optical waveguide is preferably of straight line.

The curved optical waveguide according to the present invention can also be fabricated by a method well known in the art related to the prior art curved optical waveguide. Specifically, after depositing a core material (discussed later) into a layer over the cladding, a photosensitive resist layer is further deposited over it, and the multi-layer structure is exposed to light and developed while selectively shielded with a mask shaped in a pattern of the curved optical waveguide, so as to form a resist layer in such a pattern. After that, the multi-layer structure undergoes a treatment such as etching to produce a core shaped in the desired curved optical waveguide. If the mask is modified in a pattern of the curved optical wave guide incorporated as segmented parts of the prior art curved optical waveguide of a constant core width throughout the entire extension, the optical waveguide or the optical apparatus that has the curved optical waveguide according to the present invention at least partially incorporated can be fabricated in a single manufacturing procedure.

The core material and the clad substance of the curved optical waveguide according to the present invention include inorganic materials such as glass and semiconductor material, organic materials such as resin, and some other various materials, and especially, polymers such as resin are suitable because they are quickly processible by procedures of the dry-etching and the like. Any polymer may be used, including polyimidic resins (e.g., polyimide resins, poly(imide-isoindoloquinazolin dione imide) resins, polyether imide resins, polyether ketone resins, polyester imide resins, and the like), silicone resins, acrylic resins, polystyrene resins, polycarbonate resins, polyamide resins, polyester resins, phenolic resins, polyquinolinic resins, polyquinoxalinic resins, polybenzoxyazol resins, polybenzothiazol resins, polybenzoimidazol resins, photobleeching resins (e.g., polysilane, silicone resins containing nitron compound, poly(methyl methacrylate) containing DMAPN {(4-N,N-dimethylaminophenyl)-N-phenylnitron}, dye polymer, and polyimide resin or epoxy resin containing nitron compound as disclosed in Japanese Patent Preliminary Publication No. 2001-296438, hydrolytic silane compounds as disclosed in Japanese Patent Preliminary Publication No. 2000-66051, and so forth. The above-mentioned resins may contain a fluorine atom(s). Such suitable polymers include polyimide resins because of their high glass transition temperature (Tg) and heat resistivity, and above all, fluorine-containing polyimidic resins are particularly suitable because of their transmissivity and refractive index.

Such fluorine-containing polyimidic resins include fluorine-containing polyimide resins, fluorine-containing poly (imide-isoindoloquinazolin dione imide) resins, fluorine-containing polyether imide resins, fluorine-containing polyamideimide resins, and the like.

A precursor solution of the fluorine-containing polyimidic resin can be obtained by a reaction of tetracarboxylic-dianhydride with diamine in a polar solvent such as N-methyl-2-pyrrolidone, N,N-dimethyl acetoamide, γ-butyrolactone, dimethylsulfoxide, or the like. Fluorine may be contained in both or one of the substances of tetracarboxylic-dianhydride and diamine.

The precursor solution of fluorine-free polyimidic resins can be obtained by a reaction of fluorine-free tetracarboxylic-dianhydride with fluorine-free diamine in the polar solvent such as N-methyl-2-pyrrolidone, N, N-dimethyl acetoamide, γ-butyrolactone, dimethylsulfoxide, or the like. Fluorine may be contained in both or one of the substances of tetracarboxylic-dianhydride and diamine.

The fluorine-containing acid dianhydride may be any of (trifluoromethyl) pyromellitic dianhydride, di(trifluoromethyl)pyromellitic dianhydride, di(heptafluoropropyl)pyromellitic dianhydride, pentafluoroethyl pyromellitic dianhydride, bis {3,5-di(torifluoromethyl)phenoxy}pyromellitic dianhydride, 2,2-bis(3,4-dicarboxyphenyl)hexafluoropropane dianhydride, 5,5'-bis (trifluoromethyl)-3,3',4,4'-tetracarboxybiphenyl dianhydride, 2,2',5,5'-tetrakis(trifluoromethyl)-3,3',4, 4'-tetracarboxybiphenyl dianhydride, 5,5'-bis (trifluoromethyl)-3,3',4,4'-tetracarboxydiphenyl ether dianhydride, 5,5'-bis(trifluoromethyl)-3,3',4,4'-tetracarboxybenzophenon dianhydride, bis{(trifluoromethyl) dicarboxyphenoxy}benzene dianhydride, bis {(trifluoromethyl)dicarboxyphenoxy}(trifluoromethyl)benzene dianhydride, bis(dicarboxyphenoxy)(trifluoromethyl)benzene dianhydride, bis(dicarboxyphenoxy)bis(trifluoromethyl)benzene dianhydride, bis(dicarboxyphenoxy)bis(trifluoromethyl) benzene dianhydride, bis(dicarboxyphenoxy) tetrakis(trifluoromethyl)benzene dianhydride, 2,2-bis {(4-(3, 4-dicarboxyphenoxy)phenyl}hexafluoropropane dianhydride, bis {(trifluoromethyl) dicarboxyphenoxy}biphenyl dianhydride, bis {(trifluoromethyl)dicarboxyphenoxy}bis(trifluoromethyl)biphenyl dianhydride, bis{(trifluoromethyl)dicarboxyphenoxy}diphenyl ether dianhydride, bis(dicarboxyphenoxy)bis(trifluoromethyl)biphenyl dianhydride, and the like.

The fluorine-containing diamine may be, for example, any of 4-(1H,1H, 11H-eicosafluoro undecanoxy)-1,3-diaminobenzene, 4-(1H,1H-perfluoro-1-butanoxy)-1,3-diaminobenzene, 4-(1H,1H-perfluoro-1-heptanoxy)-1,3-diaminobenzene, 4-(1H,1H-perfluoro-1-octanoxy)-1,3-diaminobenzene, 4-pentafluorophenoxy-1,3-diaminobenzene, 4-(2,3,5,6-tetrafluorophenoxy)-1,3-diaminobenzene, 4-(4-fluorophenoxy)-1,3-diaminobenzene, 4-(1H,1H, 2H,2H-perfluoro-1-hexanoxy)-1,3-diaminobenzene, 4-(1H,1H,2H,2H-perfluoro-1-dodecanoxy)-1,3-diaminobenzene, 2,5-diaminobenzotrifluoride, bis(trifluoromethyl)phenylene diamine, diaminotetra(trifluoromethyl) benzene, diamino(pentafluoroethyl)benzene, 2,5-diamino (perfluorohexyl)benzene, 2,5-diamino(perfluorobutyl) benzene, 2,2'-bis(trifluoromethyl)-4,4'-diaminobiphenyl, 3,3'-bis(trifluoromethyl)-4,4'-diaminobiphenyl, octafluorobenzidine, 4,4'-diaminodiphenyl ether, 2,2-bis(p-aminophenyl)hexafluoropropane, 1,3-bis(anilino)hexafluoropropane, 1,4-bis(anilino)octafluorobutane, 1,5-bis(anilino) decafluoropentane, 1,7-bis(anilino)tetradecafluoroheptane, 2,2'-bis(trifluoromethyl)-4,4'-diaminodiphenyl ether, 3,3'-bis(trifluoromethyl)-4,4'-diaminodiphenyl ether, 3,3', 5,5'-tetrakis(trifluoromethyl)-4,4'-diaminodiphenyl ether, 3,3'-bis(trifluoromethyl)-4,4'-diaminobenzophenon, 4,4'-diamino-p-terphenyl, 1,4-bis(p-aminophenyl)benzene, p-bis(4-amino-2-trifluoromethylphenoxy) benzene, bis (aminophenoxy)bis(trifluoromethyl)benzene, bis (aminophenoxy)tetrakis(trifluoromethyl)benzene, 2,2-bis {4-(4-aminophenoxy)phenyl}hexafluoropropane, 2,2-bis {4-(3-aminophenoxy)phenyl}hexafluoropropane, 2,2-bis {4-(2-aminophenoxy)phenyl}hexafluoropropane, 2,2-bis {4-(4-aminophenoxy)-3,5-dimethylphenyl}hexafluoropropane, 2,2-bis {4-(4aminophenoxy)--3,5-ditrifluoromethylphenyl}hexafluoropropane, 4,4'-bis(4-amino-2-trifluoromethylphenoxy)biphenyl, 4,4'-bis(4-amino-3-trifluoromethylphenoxy) biphenyl, 4,4'-bis(4-amino-2-trifluoromethylphenoxy) diphenylsulfone, 4,4'-bis (3-amino-5-trifluoromethylphenoxy) diphenylsulfone, 2,2-bis {4-(4-amino-3-trifluoromethylphenoxy) phenyl}hexafluoropropane, bis{(trifluoromethyl) aminophenoxy}biphenyl, bis[{(trifluoromethyl) aminophenoxy}phenyl]hexafluoropropane, bis{2-[(aminophenoxy)phenyl]hexafluoroisopropyl}benzene, and the like.

Two or more types of the tetracarboxylic dianhydride or the diamine may be used in combination. The precursor solution of the polyimidic resins may be photosensitive.

The precursor solution of the polyimidic resins is applied to the surface of a substrate by a spinner or a lithographic method, and the applied precursor, as a result of undergoing a thermal treatment at the final temperature ranging from 200 to 400 degrees centigrade, is cured to be polyimidic resin coating.

EMBODIMENT 1

Referring to FIG. 1, an optical waveguide R, having its part "b" curved, is provided in a substrate (not shown). Assuming now that the shortest distance from a certain point of an outer edge portion O in the curved portion b to an inner edge portion l is a waveguide width "w" at that point, the optical waveguide progressively reduces its width from the maximum waveguide width in the midst of the curved portion b toward the opposite ends of the curved portion b, and also assuming that a straight line L in the outer edge portion O between the opposite ends of the curved portion b is designated by l in length, a length from the straight line L to the apex point of the outer edge portion O is designated by h as a maximum height, a straight line L' in the inner edge portion l between the opposite ends of the curved portion b is designated by l' in length, and a length from the straight line L' to the deepest point of the inner edge portion l is designated by h' as a maximum height, the lengths and the heights exhibit a relation as follows:

$$h/l > h'/l'$$

EMBODIMENT 2

Figure 2:
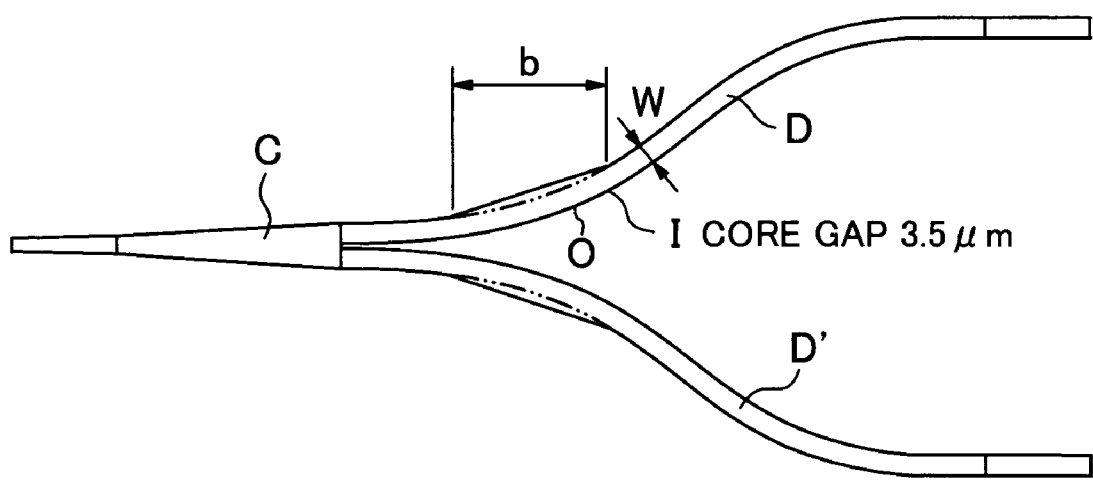
FIG. 2 is a diagram illustrating a second preferred embodiment of a Y-shaped optical waveguide according to the present invention.

Referring to FIGS. 1 and 2, a Y-shaped optical waveguide, which has a tapered waveguide C and two branching optical waveguide segments D and D' split away from the primary waveguide segment C, is provided in a substrate (not shown) where the branching optical waveguide segment D has an outer edge (convex) portion O closer to the other branching optical waveguide segment D' and an inner edge (concave) portion l successively arcuately varied on the opposite side to the outer edge portion, and assuming now that the shortest distance from a certain point of the outer edge portion O to the inner edge portion l is a branching optical waveguide width "w" at that point, the branching optical waveguide segment D progressively reduces its width w from the maximum branching optical waveguide width in the midst of the curved portion b toward the opposite ends of the curved portion b, and also assuming that a straight line L in the outer edge portion O between the opposite ends of the curved portion b is designated by l in length, a length from the straight line L to the apex point of the outer edge portion O is designated by h as a maximum height, a straight line L' in the inner edge portion l between the opposite ends of the curved portion b is designated by l' in length, and a length from the straight line L' to the deepest point of the inner edge portion l is designated by h' as a maximum height, the lengths and the heights exhibit a relation as follows:

$$h/l > h'/l'$$

An optical splitter that includes the curved optical waveguide segments configured as in FIG. 2 has excess loss due to the excessive branching width evaluated on the basis of simulation, and Table 1 below provides a split length of the tapered waveguide C, a final width of the branching portion, and the partial waveguide extensions a and b. As with the embodiment shown in FIG. 2, the extension b in the inner edge portion is a straight line; that is, a curvature=0.

In contrast, a modified sample of the optical splitter that similarly includes two curved optical waveguide segments of 6.5 micrometers in core width has the excess loss due to the excessive branching width evaluated on the basis of simulation (Sample No. 3).

The simulation results for the sample optical splitters are given in Table 1, regarding the excessive excess loss at the branching portion.

TABLE 1

| Sample Number | Split Length (μm) | Final Width of the Branching Portion (μm) | a (μm) | b (μm) | Excess Loss (dB) Due to Excessive Branching Width (λ1.31) |
|---|---|---|---|---|---|
| 1 (Embodiment of the Invention) | 550 | 17 | 210 | 170 | 0.12 |
| 2 (Embodiment of the Invention) | 450 | 16 | 180 | 260 | 0.14 |
| 3 (Comparison) | 550 | 17 | — | — | 0.20 |

As is apparent from the results given in Table 1, the optical splitter incorporating the curved optical waveguide according to the present invention can significantly reduce the excess loss due to the excessive branching width in comparison with the splitter incorporating the prior art curved optical waveguide of a constant core width throughout the entire extension.

Then, for the 1×8 splitter including the curved waveguide segments of the sample No. 2 according to the present invention, a mask is made in a core pattern. Dimensions of the core pattern should vary during the processing, and thus, the core pattern is designed by CAD, allowing for the variation in dimensions. Besides the core pattern, added to the mask are alignment marks for the enhanced positional precisions of the mask to the substrate, and other markers used for the pattern measuring. The drawing procedures by the CAD are arranged for an improved drafting efficiency, and specifically, after drawing a pattern of a single component, the drawn pattern of the single component is copied in arrays to transcribe the pattern all over the mask. The pattern of the single component is made up of multi-layers, and addition layers other than those used to draft the core pattern are used in combination to draft a Y-shaped device pattern.

The patterns in the CAD drawings drafted in this way are directly transcribed onto the mask substrate by an exposure machine, and two types of the mask are created; that is, one has a pattern filled with Cr metal film while another has a surrounding portion but the pattern filled with the Cr metal film. These two masks can be selectively used, depending upon types of resist used in the core pattern transcribing process and types of the core forming process during the optical waveguide fabricating procedures.

Along with such masks, materials as mentioned below are used to fabricate the 1×8 splitter by the following manufacturing method.

Core: OPI-N3205 available from Hitachi Chemical Co., Ltd.

Clad: OPI-N1005 available from Hitachi Chemical Co., Ltd.

A silicon wafer is coated with organic zirconium chelate by means of spinning up to a prospective dried film thickness of 100 angstrom, and after the coating is dried, a lower clad layer (8 micrometers) of fluorine-containing polyimide resin and a core layer (6.5 micrometers) are deposited over the zirconium coated wafer. The wafer with the core layer is coated with resist up to a resist film thickness of 0.5 micrometers and then dried, and thereafter, the resist is exposed to light and developed with a mask of the core pattern. The resultant resist pattern is used to selectively remove the surface material by means of reactive ion etching to leave the core layer patterned. After peeling off the resist, an upper clad layer (15 micrometers) is deposited to complete the polyimide optical waveguide.

Then, the 1×8 splitter evaluation is conducted. During the evaluation, optical fibers and fiber arrays with glass blocks are used on the opposite sides of the optical waveguide substrate so as to carry out measurements by means of active alignment method. A light source is semiconductor laser of 1.31 micrometers in wavelength.

In the case of the waveguide including the curved optical waveguide segments according to the present invention, an average insertion loss reaches −10.4 dB, and −10.7 dB at a port encountering the maximum loss. With the prior art curved waveguide of a constant core width throughout the entire extension, the average insertion loss is −11.2 dB, and it reaches −11.4 dB at a port of the maximized loss. As has been described, the 1×8 splitter including the improved optical waveguide of the present invention reduces the insertion loss, compared with another splitter including the prior art optical waveguide of a constant core width.

The curved optical waveguide according to the present invention is the one that can successfully reduce an excess loss in a curved portion of the optical path. The curved optical waveguide according to the present invention enables an improved junction of a tapered waveguide with branching segments. At the junction, if the branching segments have their respective proximal ends squeezed at an only finitely small interval from each other, a leak of light from a gap between the proximal ends of the branching segments can be reduced; that is, an excess loss due to an excessive branching width can be decreased.

What is claimed is:

1. A branching optical waveguide structure having a primary waveguide segment and two or more branching optical waveguide segments split out of the primary segment, the primary waveguide segment and the two or more branching optical waveguide segments being disposed on a same level on a substrate,
   at least one of the branching optical waveguide segments being a curved segment and provided with a core region having opposite ends, one of the opposite ends being wider than or identical to the other, and concave and convex edges, and there being one or more sections in the middle of the core region that is greater in core width than the wider one of the opposite ends or one of the identical opposite ends.

2. A branching optical waveguide structure having a primary waveguide segment and two or more branching optical waveguide segments split out of the primary segment, the primary waveguide segment and the two or more branching optical waveguide segments being disposed on a same level on a substrate,
   at least one of the branching optical waveguide segments having a convex edge successively varied in shape closer to another branching segment, and a concave edge opposite to the convex edge,
   assuming now that the shortest distance from a certain point of the convex edge to the concave edge is a waveguide width at that points, the optical waveguide progressively reducing its width from the maximum waveguide width in the midst of a curved portion toward opposite ends of the curved portion,
   assuming that a straight line L in the convex edge between the opposite ends of the curved portion is designated by l in length, a length from the straight line L to the apex point of the convex edge is designated by h as a maximum heights, a straight line L' in the concave edge between the opposite ends of the curved portion is designated by l' in length, and a length from the straight line L' to the deepest point of the concave edge is designated by h' as a maximum height, the lengths and the heights exhibit a relation as follows:

$h/l > h'/l'$.

3. A branching optical waveguide structure having a primary waveguide segment and two or more branching optical waveguide segments split out of the primary segment, the primary waveguide segment and the two or more branching optical waveguide segments being disposed on a same level on a substrate,
   at least one of the branching optical waveguide segments having its part curved so that a concave edge of the curved portion is smaller in curvature than a convex edge.

4. A branching optical waveguide structure having a primary waveguide segment and two or more branching optical waveguide segments split out of the primary segment on a substrate, according to claim 1, wherein the branching optical waveguide structure is a Y-shaped optical waveguide.

5. A branching optical waveguide structure according to claim 1, wherein the end of the curved portion closer to the primary waveguide segment is positioned 100 to 1000 micrometers away from a branching point of the waveguide.

6. A branching optical waveguide structure according to claim 2, wherein the end of the curved portion closer to the primary waveguide segment is positioned 100 to 1000 micrometers away from a branching point of the waveguide.

7. A branching optical waveguide structure according to claim 3, wherein the end of the curved portion closer to the primary waveguide segment is positioned 100 to 1000 micrometers away from a branching point of the waveguide.

8. A branching optical waveguide structure according to claim 1, wherein a length of the curved portion ranges from 100 to 400 micrometers.

9. A branching optical waveguide structure according to claim 2, wherein a length of the curved portion ranges from 100 to 400 micrometers.

10. A branching optical waveguide structure according to claim 3, wherein a length of the curved portion ranges from 100 to 400 micrometers.

11. An optical apparatus including the branching optical waveguide structure according to claim 1.

12. An optical apparatus including the branching optical waveguide structure according to claim 2.

13. An optical apparatus including the branching optical waveguide structure according to claim 3.

14. A branching optical waveguide structure according to claim 1, wherein each of the two or more branching optical waveguide segments is a curved segment and is provided with a core region having opposite ends, one of the opposite ends being wider than or identical to the other, and concave and convex edges, and there being one or more sections in the middle of the core region that is greater in core width than the wider one of the opposite ends or one of the identical opposite ends.

15. A branching optical waveguide structure according to claim 1, wherein said at least one of the branching optical waveguide segments is a S-shaped curved segment provided with a first curved core region close to the primary waveguide segment and a second curved core region away therefrom, the first curved core region having opposite ends, one of the opposite ends being wider than or identical to the other, and concave and convex edges, the convex edge of the first curved core region being successively varied in curvature, there being one or more sections in the middle of the first core region that is greater in core width than the wider end of the opposite ends or one of the identical opposite ends by expanding said one or more sections in the middle of the first core region on the side of the concave edge.

16. A branching optical waveguide structure according to claim 1, wherein each of the two or more branching optical waveguide segments is a curved segment.

17. A branching optical waveguide structure according to claim 4, wherein the angle between two branching optical waveguide segments of the Y-shaped optical waveguide is 10 degrees or less.

18. A branching optical waveguide structure according to claim 4, wherein said angle is 1 degree or less.

19. A branching optical waveguide structure according to claim 1, wherein said at least one of the branching optical waveguide segments that is a curved segment has an inner circumference that is a straight line.

* * * * *